(12) United States Patent
Petty

(10) Patent No.: US 8,739,548 B2
(45) Date of Patent: Jun. 3, 2014

(54) SLIDING RAMP NOZZLE SYSTEM FOR A GAS TURBINE ENGINE

(75) Inventor: Dale William Petty, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 1398 days.

(21) Appl. No.: 11/960,936

(22) Filed: Dec. 20, 2007

(65) Prior Publication Data

US 2009/0158703 A1 Jun. 25, 2009

(51) Int. Cl.
*F02K 1/00* (2006.01)
*B63H 11/10* (2006.01)

(52) U.S. Cl.
USPC .............. 60/771; 60/231; 239/265.19

(58) Field of Classification Search
USPC ........ 60/226.1, 228, 229, 231, 230, 232, 233, 60/235, 770, 771; 239/265.17, 265.19, 239/265.25
See application file for complete search history.

(56) References Cited

U.S. PATENT DOCUMENTS

| | | | | |
|---|---|---|---|---|
| 3,449,914 A | * | 6/1969 | Brown | 405/215 |
| 3,979,065 A | * | 9/1976 | Madden | 239/127.3 |
| 4,064,692 A | * | 12/1977 | Johnson et al. | 60/762 |
| 4,132,069 A | * | 1/1979 | Adamson et al. | 60/226.1 |
| 4,175,384 A | * | 11/1979 | Wagenknecht et al. | 60/226.3 |
| 4,391,184 A | * | 7/1983 | Yamane et al. | 92/100 |
| 4,418,708 A | | 12/1983 | Schulze et al. | |
| 4,523,603 A | | 6/1985 | Peikert | |
| 4,813,229 A | * | 3/1989 | Simmons | 60/204 |
| 5,016,818 A | | 5/1991 | Nash et al. | |
| 5,186,390 A | | 2/1993 | Enderle et al. | |
| 5,261,227 A | | 11/1993 | Giffin, III | |
| 5,261,604 A | | 11/1993 | Meyer | |
| 5,301,901 A | | 4/1994 | Kutschenreuter, Jr. | |
| 5,305,599 A | * | 4/1994 | Marvin | 60/226.3 |
| 5,307,624 A | * | 5/1994 | Even-Nur et al. | 60/226.3 |
| 5,351,476 A | * | 10/1994 | Laborie et al. | 60/785 |
| 5,351,888 A | * | 10/1994 | Taylor et al. | 239/127.3 |
| 5,402,638 A | | 4/1995 | Johnson | |
| 5,402,963 A | | 4/1995 | Carey et al. | |
| 5,404,713 A | | 4/1995 | Johnson | |
| 6,000,635 A | | 12/1999 | Justice | |
| 6,793,175 B1 | | 9/2004 | Sanders et al. | |
| 6,857,600 B1 | | 2/2005 | Walker et al. | |
| 6,948,317 B2 | | 9/2005 | Renggli et al. | |
| 7,055,307 B2 | | 6/2006 | Wehner | |
| 7,096,662 B2 | | 8/2006 | Wehner | |
| 7,134,271 B2 | | 11/2006 | Baughman et al. | |
| 7,140,174 B2 | | 11/2006 | Johnson | |
| 7,144,221 B2 | | 12/2006 | Giffin | |
| 7,188,467 B2 | | 3/2007 | Johnson | |
| 7,216,475 B2 | | 5/2007 | Johnson | |
| 7,246,484 B2 | | 7/2007 | Giffin, III et al. | |
| 7,681,399 B2 | * | 3/2010 | Orlando et al. | 60/770 |

* cited by examiner

*Primary Examiner* — Gerald L Sung
(74) *Attorney, Agent, or Firm* — Carlson, Gaskey & Olds P.C.

(57) ABSTRACT

A regulator system includes a slidable ramp intermediate a secondary flow path and a primary flow path of a gas turbine engine nozzle section.

23 Claims, 3 Drawing Sheets

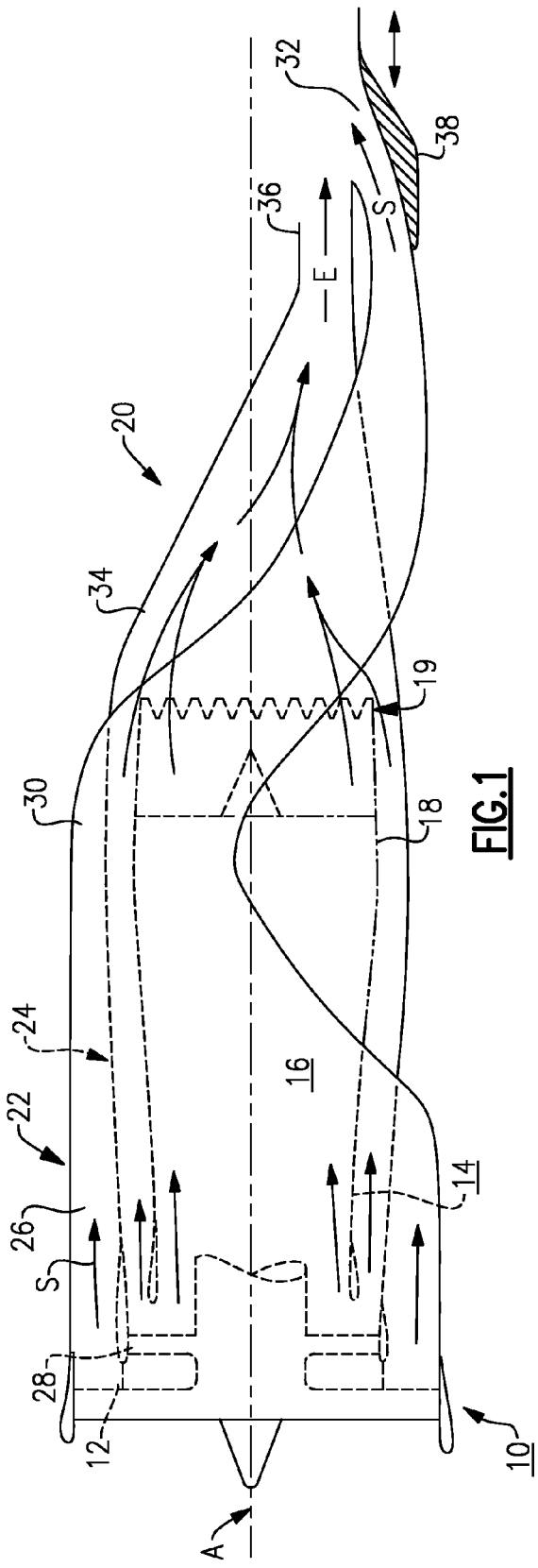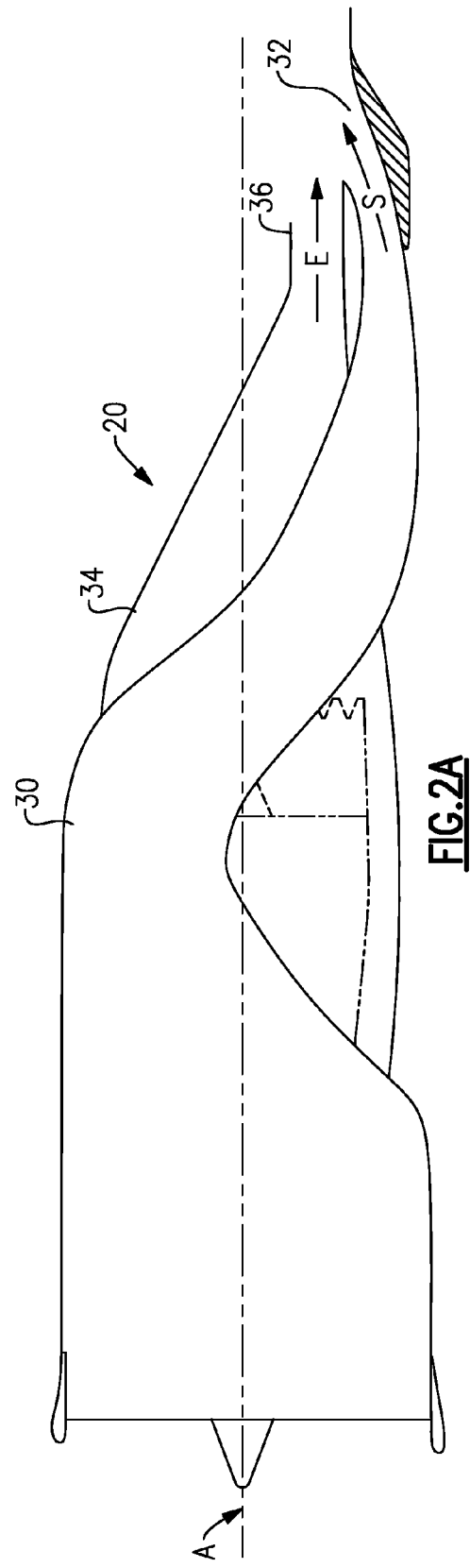

SLIDING RAMP NOZZLE SYSTEM FOR A GAS TURBINE ENGINE

BACKGROUND OF THE INVENTION

The present invention relates to a gas turbine engine and more particularly to a nozzle system therefor.

Variable cycle engines power high performance aircraft over a range of operating conditions yet achieve countervailing objectives such as high specific thrust and low fuel consumption. A variable cycle engine essential alters the engine bypass ratio during flight to facilitate efficient performance over a broad range of altitude and flight velocity such as to generate high thrust for maneuver and optimized fuel efficiency for loiter.

Variable cycle engines typically include a variable exhaust nozzle system which operates over a wide range of pressure ratios by adjustment of a nozzle throat based on the demands of the engine cycle, and may include provision for adjustment of a nozzle area ratio to facilitate desired engine performance at various operating points.

The variable cycle engine and exhaust described herein comprises of three flow streams, exhausting through two nozzles. The low pressure compressor stream and core stream exhaust through the primary nozzle. The fan stream exits the variable secondary nozzle. Varying the secondary nozzle alters thrust at the nozzle exit. Also varying the secondary nozzle exit area affects the overall engine cycle by directing of flow into or diverting away from the primary flowpath by varying third stream back pressure, thus effectively altering the bypass ratio.

SUMMARY OF THE INVENTION

A regulator system according to an exemplary aspect of the present invention includes an axially slidable ramp intermediate a secondary flow path and a primary flow path of a gas turbine engine nozzle section.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 1 is a general sectional view an exemplary gas turbine engine embodiment for use with the present invention;

FIG. 2A is a perspective side view of a nozzle system;

DETAILED DESCRIPTION OF THE DISCLOSED EMBODIMENT

Figure 2B:
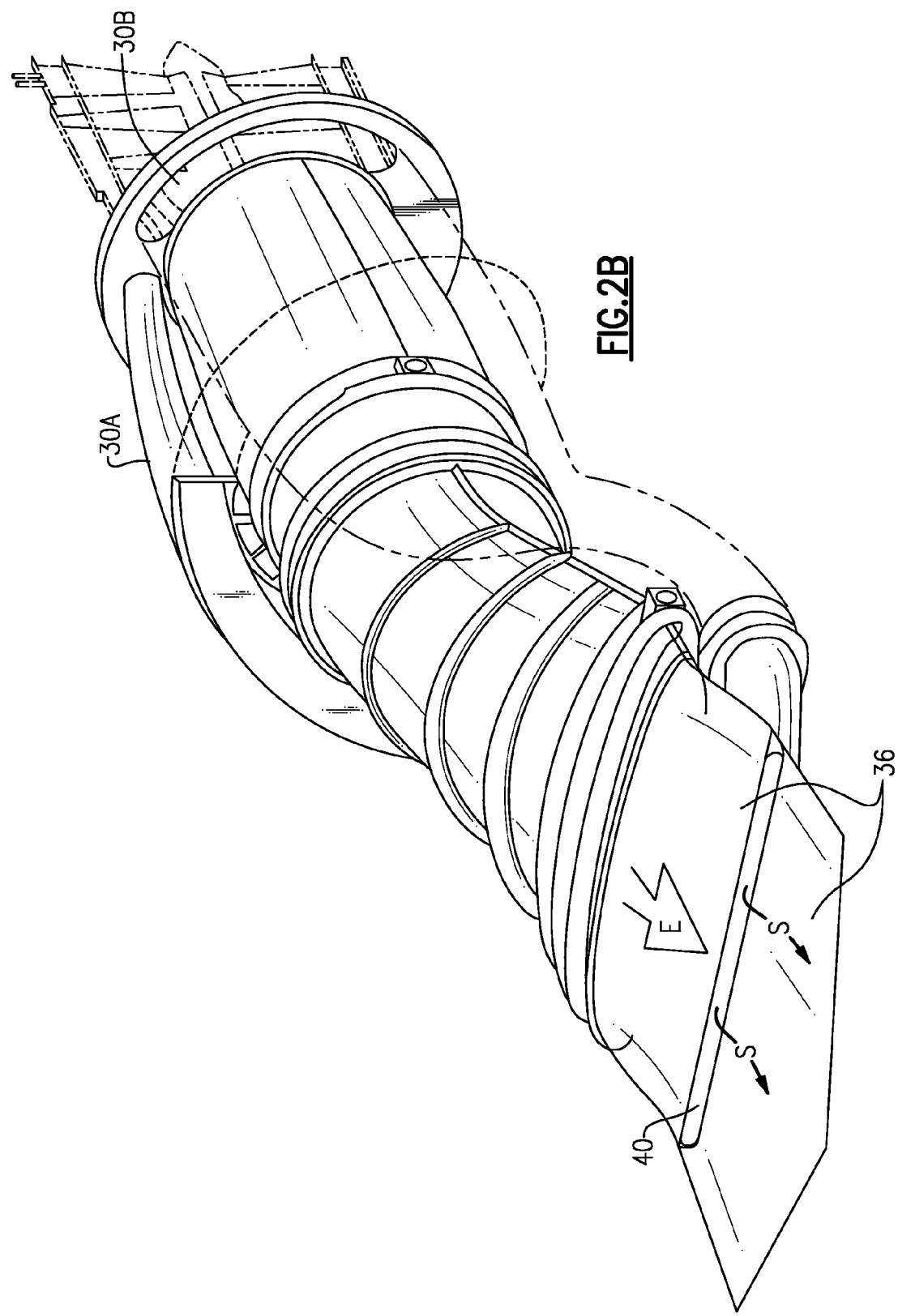
FIG. 2B is an aft partial phantom view of the nozzle system.

FIG. 1 schematically illustrates a gas turbine engine 10 which generally includes at least a fan section 12, a compressor section 14, a combustor section 16, a turbine section 18, an augmentor section 19, and a nozzle section 20. The compressor section 14, combustor section 16, and turbine section 18 are generally referred to as the core engine. An axis of the engine A extends longitudinally through these sections. It should be understood that the engine 10 may include alternative and additional sections.

An engine duct structure 22 and an inner structure 24 define an at least partially annular secondary flow path 26 at least partially around a perimeter of a primary flow path 28 which directs a primary combustion core gas exhaust flow (illustrated schematically by arrow E). It should be understood that the engine duct structure 22 may also at least partially define various airflow paths other than the disclosed secondary flow path 26.

The secondary flow path 26 guides a secondary airflow S between the engine duct structure 22 and the inner structure 24. The secondary airflow S is typically sourced from the fan section 12 and/or compressor section 14. The secondary airflow S is utilized for a multiple of purposes including, for example, cooling, pressurization, and mixing with the core gas exhaust flow E prior to discharge through the nozzle section 20 during particular operational profiles. The secondary airflow S as defined herein is any airflow different from the primary combustion core gas exhaust flow E such that a variable cycle third stream fan flow and auxiliary third flow stream deployed, for example, by opening a set of vanes located in the secondary flow path 26 surrounding the core engine may be considered a secondary airflow S as defined herein.

Referring to FIG. 2A, the nozzle section 20 generally includes a secondary flow duct 30 with a generally planar secondary nozzle 32 and a primary duct 34 with a generally planar primary nozzle 36. The secondary flow duct 30 communicates secondary airflow S therethrough and the primary duct 34 communicates primary combustion core gas exhaust flow E therethrough. The secondary flow duct 30 in one non-limiting embodiment is a bifurcated duct arrangement 30A, 30B which join at the secondary nozzle 32 (FIG. 2B). The primary duct 34 is generally circular in cross-section at an upstream segment and transitions into the planar primary nozzle 36 at an aft end segment. The secondary nozzle 32 and the primary nozzle 36 in the disclosed non-limiting embodiment include a straight shaped trailing edge, however, it should be understood that any other configuration may alternatively be utilized.

Figure 3A:
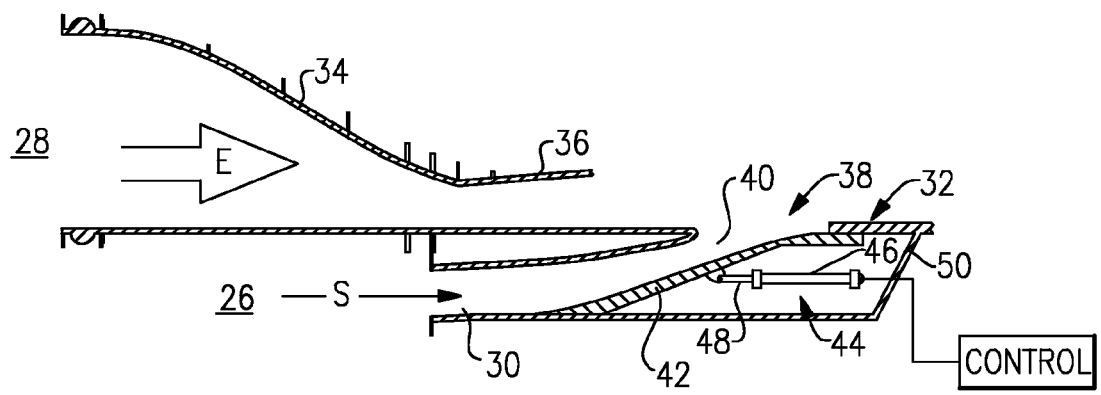
FIG. 3A is an expanded view of a regulator system in a first position for use with the gas turbine engine.

Referring to FIG. 3A, a regulator system 38 is located intermediate the secondary nozzle 32 and the primary nozzle 36 to selectively communicate secondary airflow S into the primary gas flow path E though a passage 40. The regulator system 38 allows variance of the fan stream secondary nozzle A8 and/or A9 of a convergent/divergent nozzle. The passage 40 may be generally transverse to the axis A. It should be understood that the regulator system 38 may be utilized in any nozzle location to control the mixture or injection of secondary airflow S and primary flow E.

Figure 3B:
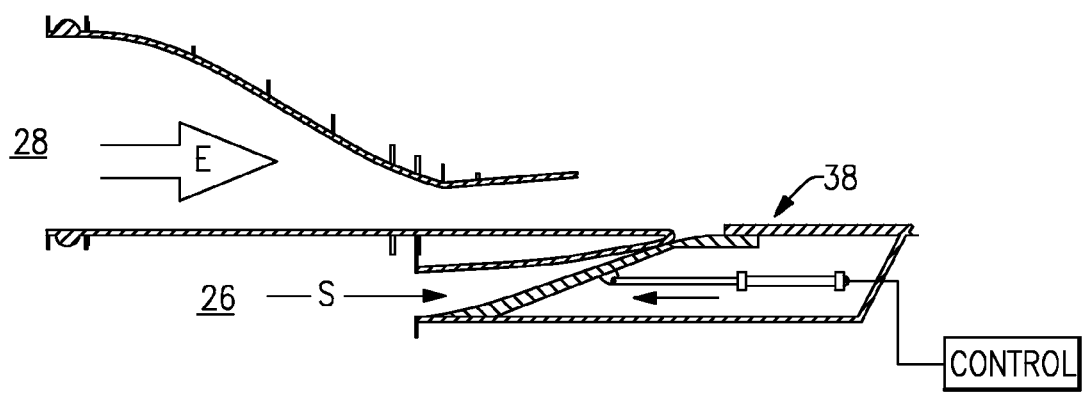
FIG. 3B is an expanded view of a regulator system in a second position for use with the gas turbine engine.

The regulator system 38 generally includes a ramp 42 which is axially movable between a closed position (FIG. 3B) and an open position (FIG. 3A). It should be understood that essentially infinite intermediate positions are available. The ramp 42 may be mounted to the secondary nozzle 32 to provide for communication between the secondary flow path 26 and the primary flow path 28 through the passage 40. The passage 40 may include a mesh, grid, metering hole, honeycomb or other shaping structure to directs and smooth the airflow therethrough as well as reduces noise generation.

An actuator system 44 having a hydraulic, pneumatic or electromagnetic actuator 46 controls movement of the ramp 42 through a linkage 48 or the like. A plenum 50 behind the ramp 42 may be provided to facilitate balance to a reference pressure such that actuator loads are reduced. It should be understood that various actuator systems and linkages may be alternatively or additionally provided.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A jet area regulator system for a gas turbine engine comprising:
a ramp adjacent a secondary flow path for a secondary flow and a primary flow path for a primary flow, said ramp axially slidable to regulate said secondary flow, said ramp adjacent to a plenum to facilitate a pressure balance of said ramp, said plenum downstream of said ramp, and wherein said ramp is downstream of a planar primary nozzle of said primary flow path.

2. The system as recited in claim 1, further comprising an actuator system which axially slides said ramp parallel to a longitudinal axis of the gas turbine engine with respect to a passage in communication with said secondary flow path.

3. The system as recited in claim 1, wherein said ramp is pressure balanced to a reference pressure.

4. The system as recited in claim 1, wherein a passage in communication with said secondary flow path is transverse to a longitudinal axis of said engine, said ramp axially slidable with respect to said passage to regulate said secondary flow therethrough.

5. The system as recited in claim 1, wherein said secondary flow is selectively sourced from a fan section of the gas turbine engine.

6. The system as recited in claim 1, wherein said primary flow includes at least a combustion core gas exhaust flow sourced from a turbine section of the gas turbine engine.

7. The system as recited in claim 6 wherein said secondary flow includes a variable cycle third stream fan flow selectively sourced from a fan section of the gas turbine engine.

8. The system as recited in claim 6 wherein said secondary flow is selectively sourced from a fan section of the gas turbine engine.

9. The system as recited in claim 1, wherein said secondary flow is selectively sourced only from a fan section of the gas turbine engine and said primary flow includes at least a combustion core gas exhaust flow sourced from a turbine section of the gas turbine engine and a flow from a compressor section.

10. The system as recited in claim 1, wherein said plenum is downstream, relative to said secondary flow, of said ramp.

11. The system as recited in claim 1, wherein said plenum urges said ramp upstream, relative to said secondary flow.

12. A nozzle section for a gas turbine engine comprising:
a secondary flow duct with a generally planar secondary nozzle to communicate a secondary flow therethrough;
a primary flow duct with a generally planar primary nozzle to communicate primary flow therethrough, said generally planar primary nozzle adjacent to said generally planar secondary nozzle;
a ramp axially slidable relative to a passage in communication with said secondary flow path to regulate said secondary flow though said passage, said ramp adjacent to a plenum to facilitate a pressure balance of said ramp, said plenum downstream of said ramp; and
wherein said primary duct is generally circular in cross-section at an upstream segment and transitions into said planar primary nozzle at a downstream segment.

13. The nozzle section as recited in claim 12, wherein said ramp is pressure balanced to a reference pressure.

14. The nozzle section as recited in claim 12, wherein said secondary duct is bifurcated.

15. The nozzle section as recited in claim 14, wherein said bifurcated secondary duct joins at said secondary nozzle.

16. The nozzle section as recited in claim 12, wherein said passage is downstream of said planar primary nozzle.

17. The nozzle section as recited in claim 12, wherein said ramp is transverse to a longitudinal axis of the gas turbine engine.

18. The nozzle section as recited in claim 12, wherein said generally planar secondary nozzle is downstream of said generally planar primary nozzle.

19. The nozzle section as recited in claim 12, wherein said secondary flow is selectively sourced only from a fan section of the gas turbine engine and said primary flow includes at least a combustion core gas exhaust flow sourced from a turbine section of the gas turbine engine and a flow from said fan section.

20. The nozzle section as recited in claim 12, wherein said secondary flow is selectively sourced only from a fan section of the gas turbine engine and said primary flow includes at least a combustion core gas exhaust flow sourced from a turbine section of the gas turbine engine and a flow from a compressor section.

21. A gas turbine engine comprising:
an engine duct structure and an inner structure which at least partially define a secondary flow path for a secondary flow and a primary flow path for a primary flow, said secondary flow path defined at least partially around a perimeter of said primary flow path;
a secondary flow duct with a generally planar secondary nozzle to communicate said secondary flow therethrough;
a primary flow duct with a generally planar primary nozzle to communicate said primary flow therethrough, said generally planar primary nozzle adjacent said generally planar secondary nozzle;
a ramp axially slidable relative to a passage in communication with said secondary flow path to regulate said secondary flow though said passage, said ramp adjacent to a plenum to facilitate a pressure balance of said ramp, said plenum downstream of said ramp; and
wherein said primary duct is generally circular in cross-section at an upstream segment and transitions into said planar primary nozzle at a downstream segment.

22. The engine as recited in claim 21, wherein said secondary duct is bifurcated.

23. A jet area regulator system for a gas turbine engine comprising:

a ramp adjacent a secondary flow path for a secondary flow and a primary flow path for a primary flow, said ramp axially slidable to regulate said secondary flow, said ramp adjacent to a plenum to facilitate a pressure balance of said ramp, said plenum downstream of said ramp; and wherein said secondary flow is selectively sourced only from a fan section of the gas turbine engine and said primary flow includes at least a combustion core gas exhaust flow sourced from a turbine section of the gas turbine engine and a flow from said fan section.

* * * * *